(12) United States Patent
Joiner et al.

(10) Patent No.: US 10,296,986 B2
(45) Date of Patent: May 21, 2019

(54) BUS STOP SYSTEMS AND METHODS OF PRIORITIZING SERVICE-BASED RESOURCES

(71) Applicant: nMetric, LLC, Costa Mesa, CA (US)

(72) Inventors: Mac Joiner, Costa Mesa, CA (US); William N. Turley, Costa Mesa, CA (US); Christine L. Koski, Dallas, TX (US)

(73) Assignee: nMetric, LLC, Dallas, TX (US)

( * ) Notice: Subject to any disclaimer, the term of this patent is extended or adjusted under 35 U.S.C. 154(b) by 0 days.

(21) Appl. No.: 15/713,598

(22) Filed: Sep. 22, 2017

(65) Prior Publication Data
US 2018/0012313 A1  Jan. 11, 2018

Related U.S. Application Data

(60) Division of application No. 15/417,922, filed on Jan. 27, 2017, now Pat. No. 10,204,387, which is a continuation of application No. 13/889,786, filed on May 8, 2013, now abandoned.

(51) Int. Cl.
*G06Q 50/04* (2012.01)
*G06Q 10/06* (2012.01)

(52) U.S. Cl.
CPC ....... *G06Q 50/04* (2013.01); *G06Q 10/06312* (2013.01); *G06Q 10/06315* (2013.01); *G06Q 10/06316* (2013.01); *Y02P 90/30* (2015.11); *Y04S 10/54* (2013.01)

(58) Field of Classification Search
CPC ............. G06Q 50/04; G06Q 10/06312; G06Q 10/06315; G06Q 10/06316; Y02P 90/30; Y04S 10/54
See application file for complete search history.

(56) References Cited

U.S. PATENT DOCUMENTS

| | | |
|---|---|---|
| 5,517,644 A | 5/1996 | Murdock |
| 6,198,980 B1 * | 3/2001 | Costanza ......... G05B 19/41865 700/97 |
| 6,415,196 B1 | 7/2002 | Crampton et al. |
| 6,560,501 B1 | 5/2003 | Walser et al. |
| 6,594,535 B1 | 7/2003 | Costanza |
| 6,609,101 B1 | 8/2003 | Landvater |
| 6,650,433 B1 | 11/2003 | Keane et al. |
| 6,699,727 B1 | 3/2004 | Toprac et al. |
| 6,714,827 B1 | 3/2004 | Brown et al. |

(Continued)

OTHER PUBLICATIONS

Koren et al., Skip-Over: Algorithms and Complexity for Overloaded Systems that Allow Skips, 1052-8725/95, 1995 IEEE, 8 pages.

*Primary Examiner* — Sujay Koneru
(74) *Attorney, Agent, or Firm* — Fish IP Law, LLP

(57) ABSTRACT

Methods of providing services to individual and methods of manufacturing items are described. Data structures to represent priority values for those individuals or items are also described. By ascribing priority values to a set of items, those items can be grouped based on those priority values. Once grouped based on priority values, the items within each group can be manufactured according to group priority as well as according to the characteristics of each item to be manufactured within that group. The same concept applies to providing services to individuals.

4 Claims, 5 Drawing Sheets

(56) References Cited

U.S. PATENT DOCUMENTS

| | | |
|---|---|---|
| 6,801,908 B1 | 10/2004 | Fuloria et al. |
| 6,889,178 B1 | 5/2005 | Chacon |
| 6,941,183 B1 | 9/2005 | Huang et al. |
| 7,020,594 B1 | 3/2006 | Chacon |
| 7,130,807 B1 | 10/2006 | Mikurak |
| 7,251,815 B2 | 7/2007 | Donovan et al. |
| 7,477,956 B2 | 1/2009 | Huang et al. |
| 7,480,623 B1 | 1/2009 | Landvater |
| 7,908,127 B2 | 3/2011 | Weigang et al. |
| 7,941,427 B2 | 5/2011 | Barsness et al. |
| 2002/0035457 A1 | 3/2002 | Brown |
| 2005/0004831 A1 | 1/2005 | Najmi et al. |
| 2005/0071825 A1 | 3/2005 | Nagaraj et al. |
| 2005/0080502 A1 | 4/2005 | Chernyak et al. |
| 2005/0131740 A1 | 6/2005 | Massenzio et al. |
| 2005/0154625 A1 | 7/2005 | Chua et al. |
| 2006/0015203 A1 | 1/2006 | Fukushima et al. |
| 2006/0025877 A1 | 2/2006 | Watanabe et al. |
| 2006/0106477 A1 | 5/2006 | Miyashita |
| 2006/0117317 A1* | 6/2006 | Crawford ............ G06Q 10/02 718/104 |
| 2006/0173713 A1 | 8/2006 | Petro et al. |
| 2007/0116215 A1 | 5/2007 | George et al. |
| 2008/0172280 A1 | 7/2008 | Goulimis |
| 2009/0240679 A1* | 9/2009 | Mehl .................. G06Q 10/02 |
| 2009/0249358 A1 | 10/2009 | Schuette |
| 2010/0249969 A1 | 9/2010 | Durst et al. |
| 2010/0268571 A1* | 10/2010 | Davies ............ G06Q 10/06311 705/7.13 |
| 2010/0280981 A1* | 11/2010 | Kato ................ G06F 17/30707 706/20 |
| 2010/0325582 A1 | 12/2010 | Bansal et al. |
| 2011/0218833 A1* | 9/2011 | Boss .................... G06Q 10/047 705/7.26 |
| 2011/0258145 A1 | 10/2011 | Denning |
| 2012/0136758 A1* | 5/2012 | Parente ............... G06Q 10/087 705/28 |
| 2012/0310402 A1 | 12/2012 | Durr |
| 2013/0081040 A1* | 3/2013 | Conner ................ G06Q 10/06 718/103 |
| 2013/0268303 A1* | 10/2013 | Messier ............... G06Q 10/063 705/5 |
| 2013/0346130 A1* | 12/2013 | Davis ............ G06Q 10/06311 705/7.14 |
| 2014/0012591 A1 | 1/2014 | Kaboff et al. |
| 2014/0040068 A1* | 2/2014 | Mohan .................. G06Q 30/02 705/26.7 |
| 2014/0067108 A1 | 3/2014 | Pedigo et al. |
| 2014/0094143 A1* | 4/2014 | Ayotte .................. G06Q 50/18 455/411 |
| 2014/0105355 A1 | 4/2014 | Toimela et al. |
| 2014/0136260 A1* | 5/2014 | Dasgupta ....... G06Q 10/063118 705/7.17 |
| 2014/0143023 A1 | 5/2014 | Reddington et al. |
| 2015/0098110 A1 | 4/2015 | Zeng et al. |
| 2015/0220081 A1 | 8/2015 | Morita |
| 2015/0317583 A1* | 11/2015 | Huang ............... H04N 21/2393 705/7.22 |

* cited by examiner

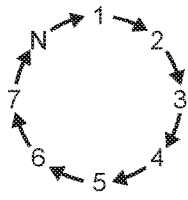

*FIG. 2A*
PRIOR ART

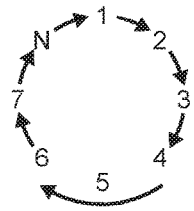

*FIG. 2B*

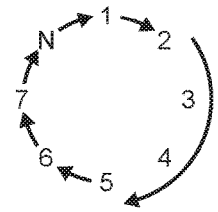

*FIG. 2C*

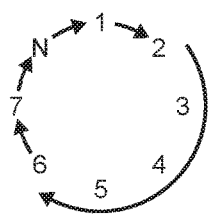

*FIG. 2D*

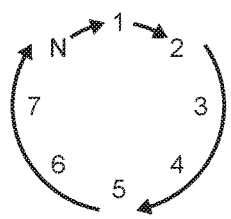

*FIG. 2E*

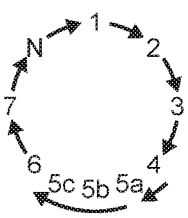

Bus Route Options

| | | |
|---|---|---|
| Resource-specific Bus or Select Existing: | ⦿ New (name) <br> `<Name>` | ○ Existing (select) <br> `<list of buses>` ▼ |
| Bus Route Size | `<Number>` | `<Days or Hours>` ▼ |
| Bus Route Start / Repeat (Select repeat type) | ○ Repeat immediately after last bus <br> ⦿ Repeat on fixed day of week | First bus start (date & time) <br> `<Date & Time>` <br> Day of week: `<Day of wk>` ▼    Time: |
| Bus Close (Select one option from each column) | When ... <br> ⦿ Start of Bus ...    ⦿ ... crosses "Now" <br> ○ End of Bus ...    ○ ... crosses Dispatch Term <br>                     ○ ... is [   ] days from "now" | |
| Setup Time Adjustment (% of standard) | 100 ⇅   % - First scheduled SSJ <br> 100 ⇅   % - Same part <br> 100 ⇅   % - New part, same part family <br> 100 ⇅   % - New part, new part family | |
| Allow SmartSubJobs to be Pinned to Time | ⦿ Yes (default)    ○ No | |
| Part Family Identifier (chars of Bus Route Sequence field) | [   ] Descending | |

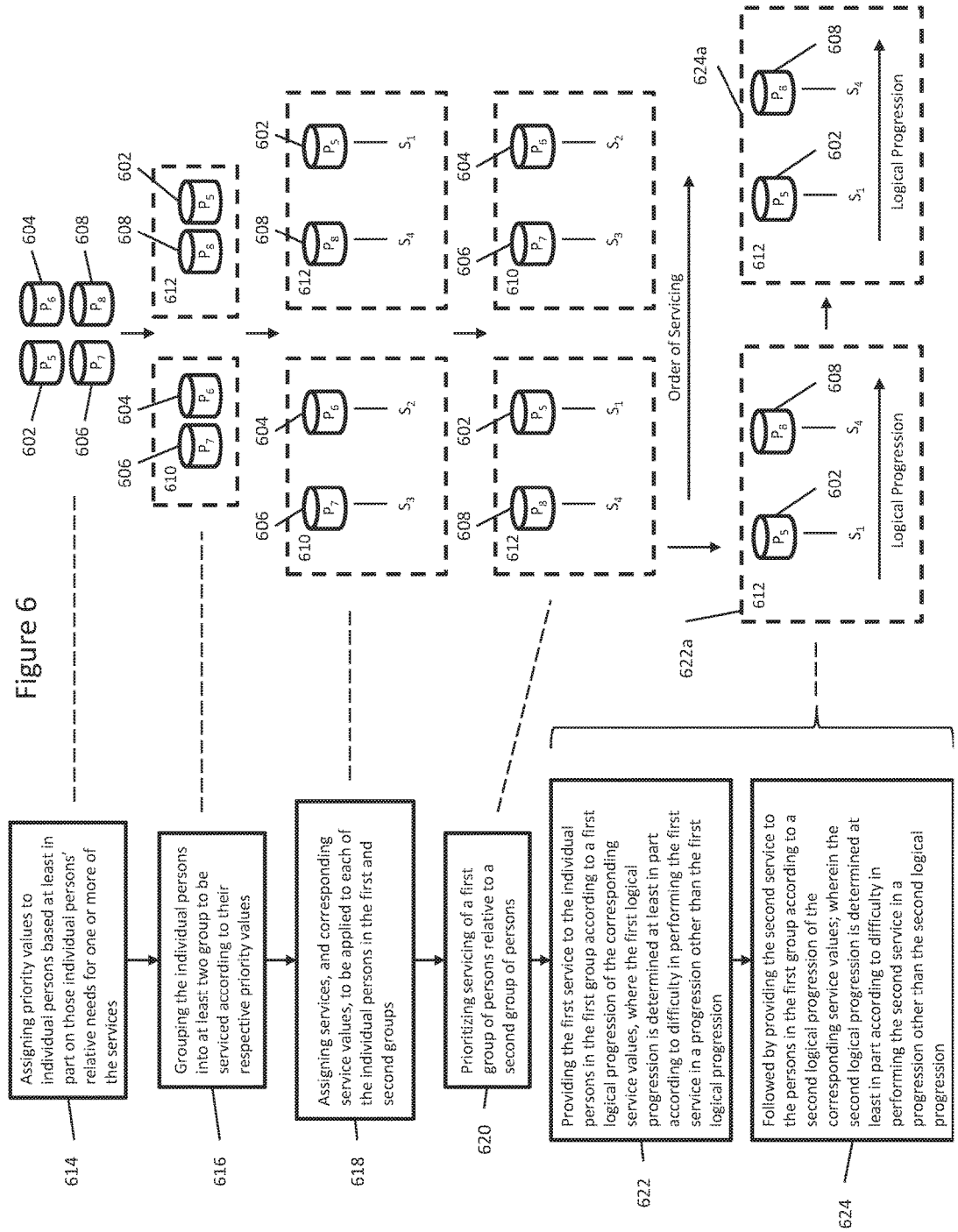

BUS STOP SYSTEMS AND METHODS OF PRIORITIZING SERVICE-BASED RESOURCES

This application is a divisional application of U.S. patent application Ser. No. 15/417,922, titled "BUS STOP SYSTEMS AND METHODS OF SCHEDULING", filed Jan. 27, 2017, which is a continuation of U.S. patent application Ser. No. 13/889,786, titled "BUS STOP SYSTEMS AND METHODS OF SCHEDULING", filed May 8, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply

FIELD OF THE INVENTION

The field of the invention is automated scheduling of equipment and other resources.

BACKGROUND

There are many types of things that can be advantageously scheduled. This includes usage of manufacturing or other types of equipment, various tools, consumables, people, animals, buildings, rooms or other locations, and even intangibles such as procedures and access to data, software, sensors, etc. Indeed, as used herein, the term "resources" should be interpreted broadly to include anything that the use of which can be scheduled.

The importance of scheduling in a manufacturing environment can be obviated to some extent by increasing inventory, either finished goods inventory or work in process inventory. But the tradeoff is not always satisfactory. Inventory is expensive to produce and store, and suffers from possible degradation and obsolescence. In addition to the stock replenishment model, scheduling is important in make-to-order manufacturing environments, where shop orders are associated with a client order, and poor scheduling can result in extremely inefficient operation.

In service fields, trying to minimize the importance of scheduling by increasing inventory is either not even possible because the "product" being provided either cannot be stored, or is impractical because the "product" is unique to a particular circumstance. For example, medical examinations cannot be inventoried for future use, and must be done on specific patients, when the patients are available and the need arises. Analogous situations exist for plumbers, electricians and other service professionals, who only have so much time each day, and must maximize service time and minimize transit time.

Years ago Toyota Production System (TPS) pioneered the concept of "lean manufacturing," which was designed to reduce inventory costs of manufactured goods by producing the goods according to efficient production cycles. Among other things, TPS-type strategies design production cycles that minimize setup costs for making different parts on a given machine. Thus, if a machine is used to produce parts 1-6, it may be that the sum of all the setup times to produce each of the parts is smallest in the following cycle, 1=>3=>4=>6=>2=>5=>1 . . . . . Once a cycle is determined to be the most cost-effective or a given piece of equipment, TPS-type systems continue to use that equipment according to that cycle, regardless of short term fluctuations in demand.

Although TPS systems have gained the most acceptance in manufacture of tangible goods, analogous strategies can be used in other contexts. For example in scheduling a conference room that is used for the same four meetings each day, with meetings 1 and 3 requiring tables and chairs, and meeting 2 and 4 requiring only chairs, a TPS type system might schedule the meetings in the order of 1=>3=>2=>4 rather than 1=>2=>3=>4 to minimize the setup time with respect to the tables.

Further discussion of TPS type scheduling can be found in U.S. Pat. No. 7,908,127 to Weignang et al. (2011), and U.S. Pat. No. 6,889,178 to Chacon (2005). Patents addressing sophisticate scheduling systems that do not use TPS include U.S. Pat. No. 8,185,422 to Yurekli (2012), US20070021998 to Laithwaite (publ. 2007), and US20090315735 to Bhavani (publ. 2009). These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Interestingly, despite years of experience with TPS type scheduling, in many countries around the globe, there is still a need for systems and methods that can adapt such systems, in real time, to changes in short-term demand for parts scheduled to be produced according to a pre-established cycle.

SUMMARY OF THE INVENTION

The inventive subject matter provides apparatus, systems and methods in which demand data is used to modify a previously established cycle for use of a resource, at least in part by bypassing (skipping over) one, two, or perhaps three or more of the steps in the cycle. When done appropriately, the inventive subject matter can improve at least one measure of efficiency.

Demand data can be acquired from any suitable sources, including especially electronic or printed orders. Of particular interest is demand data that reflects quantities and delivery or production dates, and flexibility in production (which should be construed as performance in the case of a service).

A previously established cycle can be one in which a sequence for use of the resource is optimized by minimizing or at least reducing one or more costs. In this context all possible costs are contemplated, including especially any one or more of setup costs, runtime or other activity time costs, energy costs, disposal costs, loss of business costs, penalty costs, and reputation costs. It is also contemplated that individual steps can have substeps, so that, for example, a sequence could be optimized based on minimizing or reducing a cost related to one or more substeps. As used herein, the "minimizing" means reducing something to a lowest commercially practical level, which might or might not be zero, and which might or might not be the lowest possible level.

Improvement in one measure of efficiency can be found in reducing a cost by bypassing the aforementioned steps. Such costs can be specific to the resource or type of resource. By way of example, where the resource being scheduled is a machine, the setup costs can be associated with re-tooling the machine, which for example, can include physical re-tooling and/or running different software. For software, setup costs can be associated with gaining access to, or perhaps training in use of the software. For labor, setup costs can be associated with getting a person to a desired location, training, dealing with safety issues, and/or outfitting the person for service, with protective gear or other appropriate clothing, or in some other manner. For a consumable, setup costs can be associated with getting the consumable to a desired location, and/or outfitting preparing the consumable for use. Where the resource is a physical location, setup costs can be associated with prepping the location for use, which could, for example, include bringing a piece of equipment at the location and/or configuring a piece of equipment already at the location.

Improvement in another measure of efficiency can be found in increased production (increased capacity utilization) from one or more resources.

In many cases, resources are used to produce product(s). Products produced in accordance with the inventive subject matter can advantageously be grouped into families, and possibly subfamilies. In the case of physical products, families might include different sizes, components, wirings etc. of a given part or assembly. An example is a family of screws, where the family includes different lengths, thread configurations and head shapes for a given diameter shaft. In the case of service products, families might include variations on a given medical or other procedure. Family designations are considered most useful where there are relatively smaller variations in costs of sequentially producing different members of the family relative to a family member and a non-family member. Subfamily members are considered to have even smaller such variations in costs.

Software implementing aspects of the inventive subject matter can be written to metaphorically relate to a bus or other transportation routing system, where different steps in production of a single product (or different products) are undertaken at the different stops along the route. Although not at all necessary, the inventors have found that use of a bus stop metaphor is particularly useful in allowing others to appreciate the many benefits of the contemplated systems, apparatus and methods.

Electronics to perform that processing contemplated herein can be located local or distal to the resource(s) being scheduled and/or re-scheduled.

In another aspect of the inventive subject matter, a method of manufacturing multiple items is contemplated. The method requires a number of steps to be performed, though not necessarily in a particular order. First, it requires assigning priority values to each of the items based at least in part upon relative demand for those items. Second, it requires grouping the items into at least a two groups to be manufactured according to their respective priority values. Third, it requires assigning first and second tasks (e.g., physical attributes of each item in the set of jobs), and corresponding task values, to be used in manufacturing each of the items in the first and second groups. Fourth, it requires prioritizing manufacturing of the first group of items relative to the second group of items. And finally, it requires, within the first group, executing the first task for the items according to a logical progression of the corresponding task values, followed by executing the second task for the items according to another logical progression of the corresponding task values. In some embodiments, the logical progressions can be based on color, dimension, material, preparation time, and completion time.

In some embodiments, the priority value is a data structure having at least 32 bits, 64 bits, and 128 bits. The priority value can be broken into multiple groups of bits, and each group of bits includes at least one or more bits. In some embodiments, each group of bits can represent a business rule. In some embodiments, the number of items that can be grouped together is fixed.

In another aspect of the inventive subject matter, a data structure to improve manufacturing coordination is contemplated. The data structure includes a set of digital representations of items to be manufactured, where each digital representation has a priority value and the priority value includes a plurality of bits (e.g., 32 bits, 64 bits, and 128 bits). The plurality of bits are broken into at least two groups of bits, where the groups of bits all represent business rules (e.g., activity indicator, an anchoring indicator, a due date, a duration, a job priority, an organization priority, an item number priority). In some embodiments, each digital representation of an item to be manufactured also includes one or more tasks, each task having a task value.

In yet another aspect of the inventive subject matter, a method of providing services to individual persons is contemplated. The method includes the following steps, in no particular order: (1) assigning priority values to each of the individual persons based at least in part on relative needs of those individual persons for one or more of the services; (2) grouping the individual persons into multiple groups (e.g., groups having a fixed quantity of people assigned to them) to be serviced according to their respective priority values; (3) assigning services, and corresponding service values, to be applied to each of the individual persons in the multiple groups; and (4) prioritizing servicing of one group relative to another group. Within the group having a higher priority, the method requires providing services to the individual persons according to a logical progression of the corresponding service values. In some embodiments, a logical progression is determined at least in part according to difficulty in performing a service in a progression other than the logical progression.

Preferred embodiments of the method additionally require providing services to the individual persons in the lower priority group according to another logical progression of the corresponding service values. This second logical progression is determined at least in part according to difficulty in performing the services in a progression other than the second logical progression.

In some embodiments, the priority values are data structures having at least 32 bits, 64 bits, or 128 bits. The data structures can also be broken into multiple groups of bits, each group of bits representing different service rules (e.g., an urgency, a duration, an organizational priority, and a severity).

One should appreciate that the disclosed techniques provide many advantageous technical effects including modification of a previously optimized Kanban schedule to accommodate changes in demand data for a product being produced according the schedule.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 2A is a schematic of a sequence in a cycle that can be used in scheduling a resource to produce N products.

FIGS. 2B, 2C, 2D, 2E and 2F are all schematics of the same cycle as FIG. 2A, but modified to skip one or more steps of substeps.

FIG. 3 is a schematic of an interface for software that utilizes a bus stop metaphor to assist in scheduling a resource.

FIG. 6 illustrates an embodiment of a method of providing services to individuals based on individual priority values.

DETAILED DESCRIPTION

The following discussion provides several example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
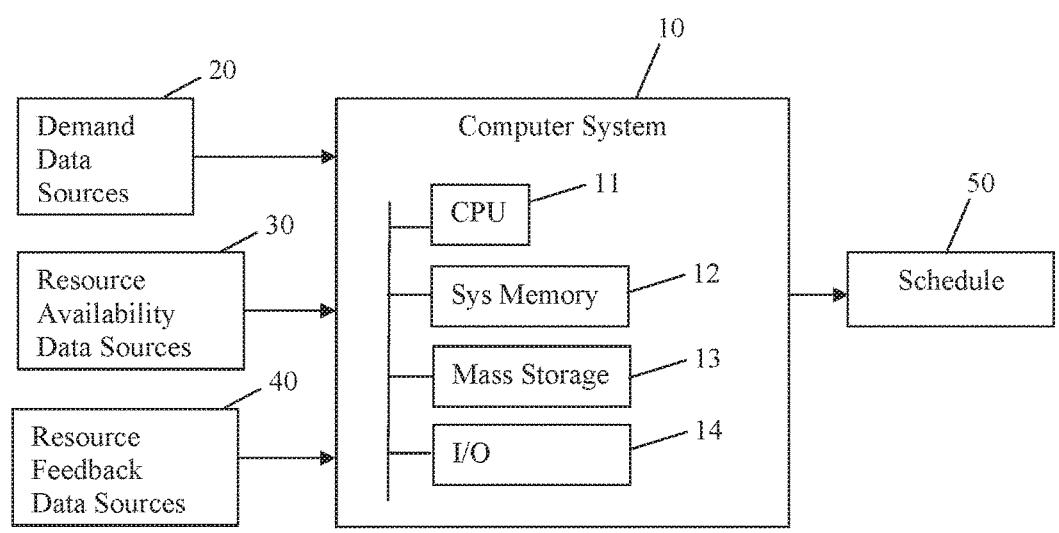
FIG. 1 is a schematic of a computer system according to the inventive subject matter.

In FIG. 1 an exemplary computer system 10 has inputs of demand data source(s) 20, resource availability data source(s) 30, and resource feedback data source(s) 40. Each of the data sources 20, 30, and 40 comprise one or more physical electronics, which can be other computer systems, cell phones, tablets, PDAs, keyboards and mice, and so forth. It is especially contemplated that one or more cell phone or other devices with a wireless communication capability can be used to operate as one or more of the data sources, 20, 30, 40, so that, for example, a person can provide data to the computer system 10 as he/she walks around a production facility, sales floor, or other environment. Computer system 10 outputs a schedule 50, which can be provided as a paper printout, a visual display, an electronic file, or in any other format.

Computer system 10 can be any suitable general or special purpose computing device having a processing unit 11, a system memory 12, a mass storage memory 13, an input/output unit 14, and a system bus 15 that couples various system components including the system memory 12 to the processing unit 11. The processing unit 11 can perform arithmetic, logic and/or control operations under control of software running on an operating system. The system memory 12 can have any suitable physical characteristics, and can be any combination of volatile and non-volatile memory. Data records storing information relating to demand data, resource availability and feedback are preferably stored on the mass storage memory 13, and more preferably in a database structure.

Although in many practical embodiments, computer system 10 will be local to the factory, hospital or other facility from which products are being produced. It is contemplated, however, that one or more of the functionalities of the various components of computer system 10 can be virtualized distally, in a cloud computing environment or otherwise.

FIG. 2A diagrams a sequence of N steps used to produce N different products, respectively, with the arrows designating a Kanban type default sequence previously considered to be a most efficient, or at least a particularly efficient sequence according to a measure of efficiency.

As used herein, the term "product" should be interpreted broadly herein to include anything that the production of which can be scheduled. This includes include both tangible and intangible products, and also services. Thus, the product of a patent attorney could be a patent application or a patent filing, the product of a physician could be a medical examination, and the product of a quality assurance examiner could be a certification or an approval report. A product could also be virtual, such that the product of an office worker could be storage of information, which might be perceivable only in the form of a report, a spreadsheet, a drawing, etc.

As used herein in the context of a service type of product, "production" of the product should be interpreted herein to mean performing or otherwise provisioning of the service. For example, if an office worker's product is spell-checking a document, production of that service could mean the act of spell-checking the document, or perhaps obtaining the services of another to spell-check the document.

As used herein the term "provisioning" means making available, including manufacturing, making, obtaining, securing, and otherwise providing.

As used herein with respect to products, the term "part" can refer to a tangible component of a tangible product, or an intangible component of software or other intangible product, and analogously, portions of a service being provided. In some instances a product can comprise a single part, which is then sold or otherwise provided to a marketplace. In such instances the terms "part" and "product" would be co-extensive. In other instances a product could comprise multiple parts. In yet other instances, a part could be a product in itself, and also one of multiple parts in a product. For example, a computer manufacturing company might manufacture electronic boards, and sell them as standalone products. The same company might also include those boards in a computer, and then sell the computer as a product.

Products can be viewed as members of one or more families. Thus, different sizes of screws could be considered members of a family of screws, with different sub-families based on thread pattern or head shape. Service products are also contemplated to exist in families. For example, where a product is a medical procedure or running of a diagnostic test, a family could include similar types of procedures or tests.

In general, the concept of product families as used in the context of scheduling, refers to parts or products that have similar resource requirements. Thus, referring back to the example of a family of screws, production of each of the different types of screws in a family would tend to use the same type of raw material, the same milling equipment, similar tooling within the equipment, and so forth.

Contemplated cycles can have any realistic number of steps, and substeps. A cycle having only one or two steps and no substeps, however, is of no consequence, and is expressly excluded from the terms "cycle" or "cycles as those terms are used herein. Thus, in FIG. 2, steps 4-N are optional. At the other extreme, a cycle having hundreds of steps or substeps might be so complex that systems and methods contemplated herein would be of minimal value. The sweet spot is probably working with cycles that have a total of five to fifty steps and substeps.

Different steps in a cycle can be associated with production of the same or different products. For example, in a manufacturing context, different steps could be associated with producing different sizes, configurations, components and wirings of the same or analogous parts. In the particular example of construction of a desktop computer, different steps could involve inserting a disk drive, an internal memory card, an interface card, and so forth.

In FIG. 2B, the sequence of N steps used to produce N products has been altered in accordance with demand data so that step 5 is skipped, thus precluding production of product 5.

Demand data used to skip step 5 in FIG. 2B, or other steps in other Figures, can be acquired from any suitable sources, including especially electronic or printed orders. Of particular interest is demand data that reflects quantities and delivery or production dates, and flexibility in production (which should be construed as performance in the case of a service).

Demand data used to skip step 5 in FIG. 2B, or other steps in other Figures, is preferably data reflecting expected medium term demand, which is defined herein to cover a time period of between 3 and 14 days, more preferably between 5 and 9 days, and most preferably 7 days.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

In FIG. 2C, the sequence of N steps used to produce N products has been altered in accordance with demand data so that steps 3 and 4 are both skipped, thus precluding production of products 3 and 4.

In FIG. 2D, the sequence of N steps used to produce N products has been altered in accordance with demand data so that steps 3, 4, and 5 are all skipped, thus precluding production of products 3, 4 and 5.

In FIG. 2E, the sequence of N steps used to produce N products has been altered in accordance with demand data so that steps 3, 4, 6 and 7 are all skipped, thus precluding production of products 3, 4, 6 and 7.

FIG. 2F shows the same sequence of N steps used to produce N products as in FIGS. 2A, 2B, 2C, 2D and 2E. Here, however, step 5 (used to produce product 5) is expanded to show substeps 5a, 5b and 5c. In this particular instance, and production has been has been altered by skipping substeps 5b and 5c, in accordance with demand data.

It is also contemplated that the demand data might present a situation where a default schedule is modified in a manner that is less efficient according to the measure of efficiency. For example, if the demand data includes information that demand for the first item is flexible while demand for the second item is inflexible, it might be advantageous for the system to skip over at least one of the steps or substeps involved in producing the first item, even though there are high costs and lowered efficiency in doing so. This might well happen in the case of a hospital, where surgeries are scheduled in a surgical suite according to an efficient cycle of staff availability and prep/cleanup times. If the hospital is suddenly confronted with the need to perform an emergency surgical procedure, the demand is so high and so inflexible that it makes sense to skip over one or more previously established steps.

In another example, the demand data may show that a first product is needed at an unusually high volume. In that case a default schedule might be modified in a manner that bypasses production of that product on the usual machine, so that the product can be produced on a different machine that can handle higher volumes.

Systems and methods contemplated herein can interface with a user in any suitable manner. In many instances, however, the interface will be computer generated, and will render information to the user on paper or using some sort of visual display. Displaying information in the form of metaphors can be helpful in that regard, and one class of metaphors that is thought to be especially valuable are metaphors that treat steps of a cycle as being carried by a transport. Transport metaphors that are currently thought to be useful include one or more of a bus, train or a ship carrying a set of orders or other requirements around a route with stops along the way corresponding to the steps of a cycle. FIG. 3 is an example of such an interface suing a bus stop metaphor to assist in scheduling a resource.

Although various parameters are presented to users within the context of a metaphor, the computer software and hardware providing the metaphor would very likely store the related information as records in an electronic file using some form of database records.

Example 1

A manufacturing company produces precision optics, where fabricated parts are machined for assembly. These machined parts are stored in a "supermarket" between machining and assembly using a Kanban type system to signal a requirement back to machining as assembly consumes them. These parts have a consistent demand with the some parts being consumed daily in assembly. The three issues of greatest concern are: daily material shortages, excess inventory and machining capacity. The solution is to establish a bus route methodology and to "right size" the Kanban quantities.

The assets that are the most capacity-constrained are the Swiss Turning Centers, so that is where the bus route methodology was deployed. First, families of similar parts were defined regardless of what specific asset was producing them using the router as the initial set of data. The similarities indicated what tools were being employed and this was validated in the second pass at families. The programs were then evaluated and revised to ensure the same locations were used for the same tools. At this point a capacity check was performed to validate the family definition was within the desired load for an asset.

A sequence was then defined for every part within the families for each asset that minimized the changeover time from part to part. This sequence only took into account tooling and changeover similarities. Demand variation had no impact on the family definition, or placement in the sequence.

A demand accumulation period was then defined as a week. Because the parts were fairly consistent in demand, it was determined that a week would be long enough to accumulate enough demand across each family to take enough advantage of the changeover optimization.

In execution, demand accumulates for a week, the parts that need to be produced are then placed in the appropriate sequence and a schedule is provided to machining for the following week by turning asset. The critical step, with respect to the currently claimed subject matter, is that any parts that were in the sequence, but did not have any demand for the week were skipped.

The results were an increase in capacity by about 20% as changeover times were reduced and a decrease in inventory by about $3 M for the machined parts. As the company had about 37 Swiss Turning Centers, about $250 to $300K each, the cost avoidance was about 7 Turning Centers or about $2 M in saved capital expenditure.

Example 2

A MTO (make to order) fabrication company supplies various agricultural, automotive and other markets. This company does both repetitive parts, as well as "one off" parts. They typically cut sheet metal via laser or punch, brake (bend), stamp, deburr, and sometimes punch or machine. The two issues of greatest concern are: machine capacity and response time.

The assets that were perceived as the most capacity constrained were the brakes. So that is where the bus route methodology was implemented. Where other machining have many "pockets" for tools, or a tool holder attached to a machine, brakes are limited by the width of the bed and the depth of each individual tool. So, changeovers can be lengthy and may be required when performing multiple bends on the same part on the same machine.

Families of similar parts were established using the prints that indicated similar tooling requirements and size of part. The tools were then evaluated to determine which asset could be used. Then material thickness was reviewed as the amount of force required to bend the part increases with material thickness and the available assets had varying tonnage capacity. A capacity check was then performed to ensure the desired load was reflected in the part families selected by asset.

A sequence was then developed by first identifying the parts that used the same bottom half of the tool and then the appropriate sequence for the replacement of the top half. This defined the first family. This progression was repeated until all the families were defined for that asset.

A demand accumulation period was then defined as a week. It was determined that a week would be long enough to accumulate enough demand across each family to take enough advantage of the changeover optimization as a starting point. The accumulation period was to be reviewed over time by asset and changed as appropriate.

A brake was paired with either a laser, or a punch and the output of those assets went immediately to the brake when each sheet was cut.

In execution, demand accumulates for a week, the parts that need to be produced are then placed in the appropriate sequence and a schedule is provided to the laser or punch for the following week by the brake sequence. Here again, the critical step with respect to the currently claimed subject matter, is that any parts that were in the sequence, but did not have any demand for the week were skipped.

It was estimated that the bus route would provide an increase in brake production capacity by about 15 to 17%.

Figure 4:
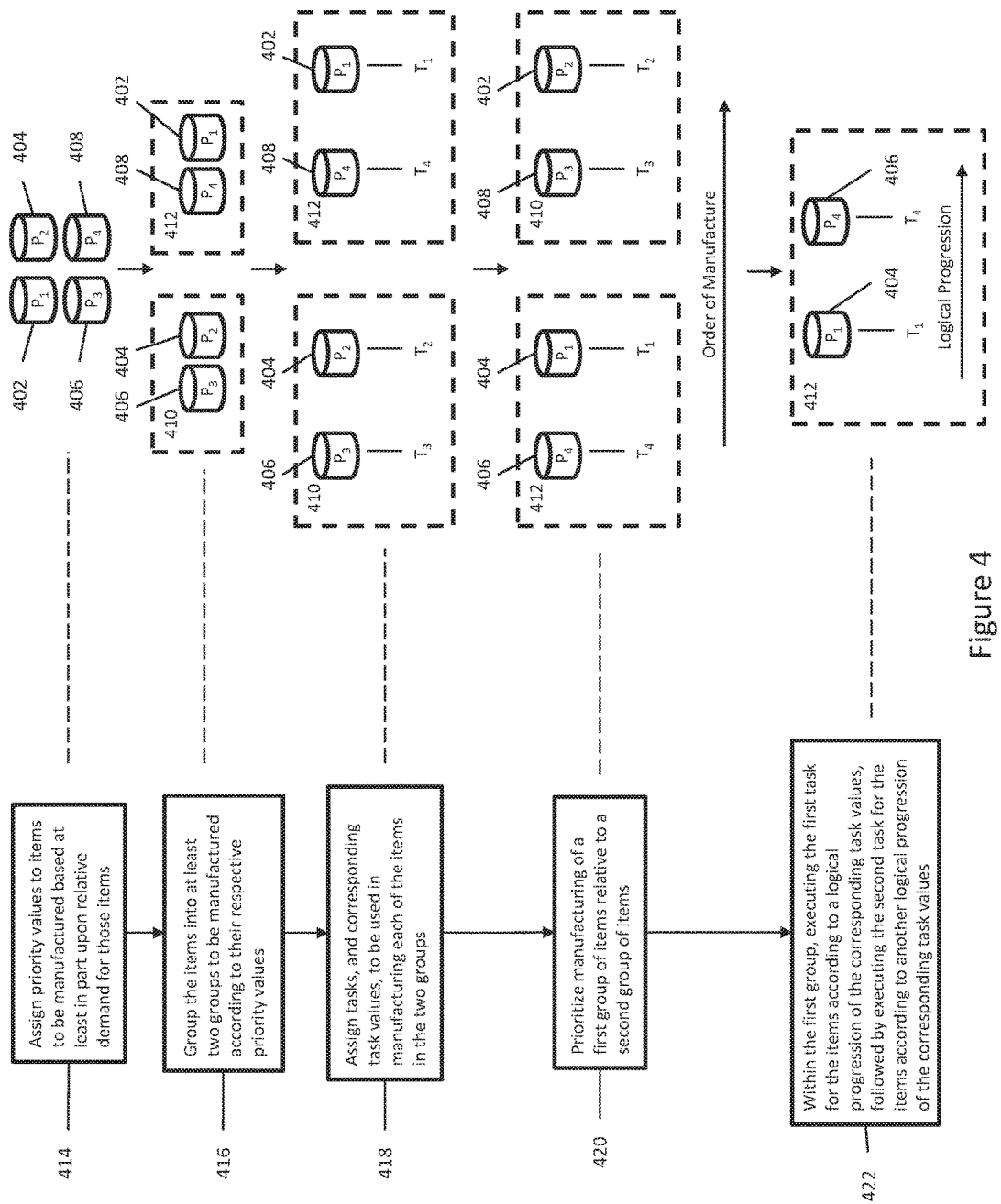
FIG. 4 illustrates an embodiment of a method of manufacturing items based on item priority values and item characteristics.

FIG. 4 illustrates the flow of a method of manufacturing multiple items. The method generally includes five steps 414, 416, 418, 420, and 422. In the first step 414, priority values are assigned to items to be manufactured 402, 404, 406, and 408. The priority values $P_1$, $P_2$, $P_3$, and $P_4$, for example, can be based at least in part upon relative demand for manufacture of those items 402, 404, 406, and 408. Demand can be quantified in a number of ways. For example, priority can be related to a demand among consumers, or it can be a demand for a particular part to be completed in order for a larger component to be manufactured or completed.

Figure 5:
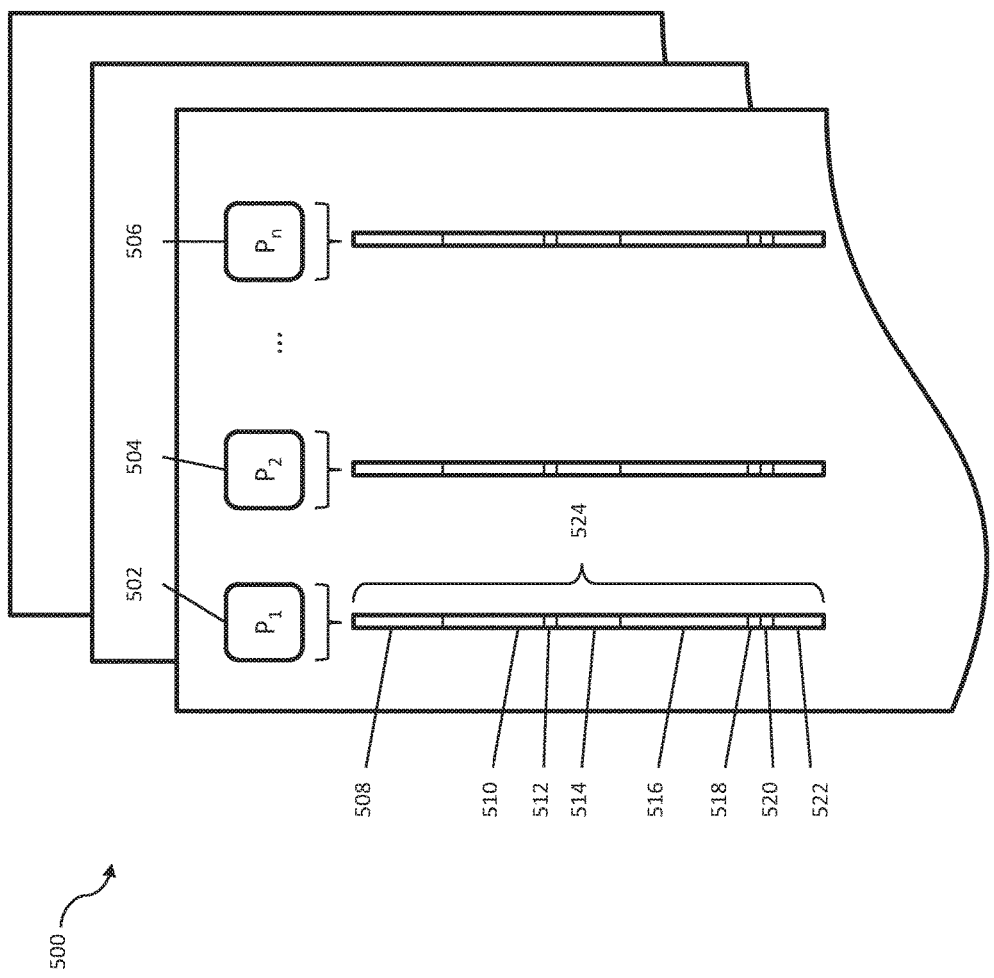
FIG. 5 illustrates a data structure to represent priority values as described in this application.

Priority values are described more thoroughly in the context of FIG. 5. FIG. 5 is a visual representation of a contemplated data structure 500. The data structure 500 includes various priority values $P_1$ (502), $P_2$ (504), through $P_n$ (506) such that the data structure 500 can hold n number priority values. Each priority value within the data structure 500 is then represented by some number of bits 524. For example, a priority value can be represented using between 1-16, 16-32, 32-64, 64-128, 128-256, and so on, depending on bit lengths required to adequately express a priority value. In some embodiments, for example, priority values can include 32, 64, 128, or even 256 bits. The effect of increasing or reducing the number of bits is that the number of cycles required to process each priority value can increase or decrease.

Taking priority value $P_1$ (502) as an example, the bits 524 making up the priority value 502 are broken into different bit groups 508, 510, 512, 514, 516, 518, 520, and 522. Each bit group 508, 510, 512, 514, 516, 518, 520, and 522 represents a different quantity, quality, or attribute that contributes to determination of overall priority of the item having that priority value. For example, bit groups can represent: demand for an item, whether an item must be anchored, a duration to manufacture an item, a due date for the item to be manufactured, an internal priority, a part number priority, an organizational priority, an assembly priority, or any other type of quantity, quality, or attribute that could be used to determine priority.

In some embodiments, the bit groups 508, 510, 512, 514, 516, 518, 520, and 522 can be organized into different sequences. Bit groups can be sequenced according to which of them are more pertinent to a priority value. For example, if the most important attribute of an item to be manufactured is demand for that item, then the bit group representing demand could be placed first in the sequence of bit groups for that particular priority value. Each sequential bit group ordered after the first bit group would similarly represent less and less "important" quantities, qualities, or attributes of the item to be manufactured. More generally, bit groups representing business rules are placed before other, lower precedence bit groups.

In a second step 416, once all of the items to be manufactured 402, 404, 406, and 408 are assigned priority values $P_1$, $P_2$, $P_3$, and $P_4$, the items are then placed into at least two different groups 410 and 412. Items groups 410 and 412 are created according to the assigned priority values $P_1$, $P_2$, $P_3$, and $P_4$. For example, items with higher priority values (e.g., $P_3$ and $P_2$ in the example in FIG. 4) are grouped into a first group 410, and items with relatively lower priority values (e.g., $P_4$ and $P_1$ in the example in FIG. 4) are grouped into subsequent groups (e.g., group 412 in the example in FIG. 4).

In step 418, each of the items to be manufactured 402, 404, 406, and 408 is also assigned a task value $T_1$, $T_2$, $T_3$, and $T_4$. Task values $T_1$, $T_2$, $T_3$, and $T_4$ are used to determine an order of manufacture or execution within each of the groups 410 and 412 which were defined based on priority values $P_1$, $P_2$, $P_3$, and $P_4$. In some embodiments, task values $T_1$, $T_2$, $T_3$, and $T_4$ can include attributes of a manufacturing task, such as size, color, type, material, required tooling, and so on.

Task values can be a variety of attributes of a particular item to be manufactured. For example, in the context of manufacturing a bicycle, task values can correspond to a part (frame, fork, seat, wheel, cog, etc.), a color (red, orange, yellow, green, blue, indigo, violet, etc.), a material (steel, aluminum, carbon fiber, etc.), and so on.

In step 420, the different groups 410 and 412 of items to be manufactured 402, 404, 406, and 408 are prioritized according to which group should be manufactured first. This step can alternatively be viewed as placing the items having high priority values into the first group to be manufactured and the items having lower priorities being placed into each subsequent group of items to be manufactured.

In step 422, as mentioned above, the items to be manufactured 402, 404, 406, and 408 within each of the groups 410 and 412 are placed into an order for manufacture based on the task values $T_1$, $T_2$, $T_3$, and $T_4$ corresponding to each of the different items to be manufactured 402, 404, 406, and 408. Once this step is completed, the items to be manufactured 402, 404, 406, and 408 will have been sorted first according to priority values $P_1$, $P_2$, $P_3$, and $P_4$ and second according to task values $T_1$, $T_2$, $T_3$, and $T_4$ among the items within each of the groups.

After each of steps 414 through 420 are completed, the task values $T_1$ and $T_4$ associated with each of the items to be manufactured 404 and 406 within the higher prioritized group 412 are executed according to a logical progression. A logical progression can be defined according to one or more the task values $T_1$ and $T_4$. For example, a logical progression could be based on color, dimension, material, preparation time, completion time, item type, etc., or it could also be based on some combination thereof.

FIG. 6 illustrates the flow of a method of providing services to individuals in a similar manner to that of the method in FIG. 4. The method described in FIG. 6 facilitates the provision of services to individuals 602, 604, 606, and 608 by in a first step 614 assigning priority values $P_5$, $P_6$, $P_7$, and $P_8$ to those individuals based at least in part on the relative needs of each of those individuals for various services.

Services provided using the method can vary and fall within many different categories. In some embodiments, the services are medical in nature. In the context of medical service provision, the services can be any type of medical service including, for example, various stages of triage care, checkups, therapies (e.g., physical, speech, etc.), surgeries (e.g., in-patient or out-patient), or any other type of care including the subsets of services associates with those types of care). In another context, services can be physical activity oriented. For example, in the context of a summer camp services can include horseback riding, water skiing, jumping rope, singing campfire songs, and so on. Each of these activities can also include subset of services that could similarly be considered services within the meaning of this application. For example, jumping rope could include the service of providing a jump rope and then providing instructions.

Priority values $P_5$, $P_6$, $P_7$, and $P_8$ in the context of FIG. 6 can be based a number of different types of priorities. For example, priority values $P_5$, $P_6$, $P_7$, and $P_8$ can be based on a priority for an individual to receive a particular service. In other embodiments, priority values can indicate a more general concept of priority by taking into account many different factors. As described more thoroughly in the context of FIG. 5, priority values can be expressed as strings of bits, where different groups of those bits represent different considerations regarding priority. In the context of providing services, bit groups can represent, for example: need for a service, demand for a service, duration of time required to provide service, times that the service is provided, present availability of a service, distance to a service, availability of a specialist required for the service, etc.

Once priority values $P_5$, $P_6$, $P_7$, and $P_8$ are assigned to each of the individuals 602, 604, 606, and 608, the next step 616 involves grouping the individuals according to their associated priority values $P_5$, $P_6$, $P_7$, and $P_8$. In the example in FIG. 6 only two groups 610 & 612 of individuals are formed, but in some embodiments additional groups can also be formed, depending on how many individuals there are and also based on how many individuals should exist per group. Groups can be restricted to only a certain number of individuals in some embodiments (e.g., 1-5, 5-10, 10-15, 15-20, 20-25 individuals per group). The size of a group can be defined arbitrarily (e.g., manually), it can be defined as a function of availability of a service, or it can be defined as a function of demand for a service.

Once individuals 602, 604, 606, and 608 are placed into groups 610 & 612, the next step 618 involves assigning service values $S_1$, $S_2$, $S_3$, and $S_4$ to the individuals 602, 604, 606, and 608. In some embodiments, services are assigned to the groups (e.g., determining a service that a group needs and subsequently assigning that service to the group so that the group will ultimately be provided that service). In other embodiments, services are instead assigned to individuals and those individuals having the same services assigned to them are likewise placed into groups together.

Groups of individuals do not necessarily need to be formed based on required services. In some embodiments, a group can include individuals that do not all require the same service. In these embodiments, the priority value associated with each individual can include a bit group representing a required service that is a factor in determining priority, rather than being the sole factor.

In step 620, after groups 610 and 612 have been formed, prioritization of service provision takes place. In this step, an order for providing services to the groups is determined. This order can be based on a number of factors including: the time it takes to execute a service, the availability of a service, the relative priorities of the groups of individuals requiring one or more services, and so on. In some embodiments, since groups are created according to priority values corresponding to individuals, the group having the individuals with the highest priorities according to priority values are serviced first.

Next, in step 622, one or more services is provided to the individual persons in a group of individuals 612 (e.g., a higher priority group) according to a logical progression of the corresponding service values as represented by 622a. When a service or services are executed according to a logical progression, services are provided to the individuals within a group in sequence according to the service values (e.g., $S_1$, $S_2$, $S_3$, and $S_4$) assigned to those individuals. In some embodiments, services can be applied to more than one individual at a time, but in other embodiments, only single individuals can receive a service at a time. A logical progression can be determined based on a difficulty of providing the service or services in any other order or progression (e.g., a logical progression can be a path of least resistance for service provision based on the services required by the individuals within a group and based on ease of providing those service(s)).

After providing a service or services to the group of individuals 612 in step 622, step 624 describes providing another service or services to that same group of individuals according to a second logical progression as represented by 624a. This step is considered optional.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. In a system configured to execute a service according to a pre-arranged logical progression of services, a method of using a data structure to dynamically manipulate physical implementation of a service cycle, the method comprising:

for each of first, second, third and fourth services to be administered, storing a record in the data structure that includes a priority value based at least in part based upon relative demand for the first, second, third and fourth services;

storing in each of the records for the first, second, third and fourth services, at least one task and corresponding task value to be using in providing the corresponding service, wherein the stored tasks overlap with the tasks of the pre-arranged logical progression of services;

comparing the stored priority values to group the first, second, third and fourth services into (a) the first group of services and (b) a second group of services;

using the stored priority values to prioritize execution of the first group relative to the second group;

receiving demand data indicating that a priority value for a high-priority service exceeds a demand threshold, wherein exceeding the demand threshold requires one or more tasks to be removed from the pre-arranged logical progression of tasks to meet a service requirement for the high-priority service;

triggering execution of the stored tasks for the first group of services according to a modified progression that skips over one or more lower priority tasks of the pre-arranged logical progression; and using a physical asset to execute the modified progression during the service cycle, in a manner that executes the high-priority service to satisfy the service requirement, wherein satisfying the service requirement is prioritized over minimizing the service setup costs.

2. The method of claim 1, wherein the priority values are stored in the data structure using at least first and second groupings of bits that represent first and second different business rules, respectively.

3. The method of claim 2, wherein each bit group comprises at least one of 32 bits, 64 bits, and 128 bits.

4. The method of claim 2, wherein the first and second business rules each comprise at least one of an urgency, a duration, an organizational priority, and a severity.

* * * * *